United States Patent
Kono et al.

Patent Number: 5,356,553
Date of Patent: Oct. 18, 1994

[54] SOLID ELECTROLYTE

[75] Inventors: Michiyuki Kono, Neyagawa; Kenji Motogami, Takatsuki; Shigeo Mori, Kyoto, all of Japan

[73] Assignee: Dai-Ichi Kogyo Seiyaku Co., Ltd., Kyoto, Japan

[21] Appl. No.: 957,258

[22] Filed: Oct. 6, 1992

[30] Foreign Application Priority Data

Oct. 15, 1991 [JP] Japan .................. 3-296173

[51] Int. Cl.$^5$ ............................. H01G 9/02
[52] U.S. Cl. ................... 252/62.2; 429/192
[58] Field of Search ............... 252/62.2, 500; 429/192, 429/194

[56] References Cited

U.S. PATENT DOCUMENTS

| | | | |
|---|---|---|---|
| 4,908,283 | 3/1990 | Takahashi et al. | 429/192 |
| 4,970,012 | 11/1990 | Kuroda et al. | 252/62.2 |
| 5,098,589 | 3/1992 | Motogami et al. | 252/62.2 |
| 5,116,541 | 5/1992 | Motogami et al. | 252/500 |
| 5,159,001 | 10/1992 | Motogami et al. | 524/157 |

FOREIGN PATENT DOCUMENTS

| | | |
|---|---|---|
| 425255A2 | 5/1991 | European Pat. Off. . |
| 425255A3 | 5/1991 | European Pat. Off. . |
| 3-177409 | 1/1991 | Japan . |
| 3-126210 | 5/1991 | Japan . |
| 3-151617 | 6/1991 | Japan . |

OTHER PUBLICATIONS

European Search Report and Annex to European Search Report, Feb. 4, 1993.
Patent Abstracts of Japan, vol. 12, No. 452, 28 Nov. 1988 [Abstract].

*Primary Examiner*—Prince Willis, Jr.
*Assistant Examiner*—Alan D. Diamond
*Attorney, Agent, or Firm*—Morgan & Finnegan

[57] ABSTRACT

A solid electrolyte is prepared by dissolving a solvent and an electrolyte salt in a trifunctional polymer and crosslinking it by an irradiation of an active radiation and/or heating, characterized by that said trifunctional polymer is a trifunctional terminal acryloyl-modified alkylene oxide polymer containing a polymer chain expressed by the following general formula (I) as each functional chain;

$$-(CH_2CH_2O)_m-(CH_2CHR'O)_n-\overset{O}{\overset{\|}{C}}-\overset{R''}{\overset{|}{C}}=CH_2 \quad (I)$$

in which R' is a lower alkyl group, R" is hydrogen or methyl group and m or n is 0 or an integer of at least 1 and m+n≧35, and the amount of said solvent is 220 to 950 weight % based on said trifunctional terminal acryloyl-modified alkylene oxide polymer.

3 Claims, No Drawings

SOLID ELECTROLYTE

BACKGROUND OF THE INVENTION

The present invention relates to a solid electrolyte having ionic conductivity which can be used for cells, electrochromic display elements (ECD) and sensors.

Various methods have been proposed to produce solid electrolytes. For example, there has been known a method in which an acryloyl-modified polymer having alkylene oxide polymer chain is mixed with an electrolyte salt or a solvent soluble in them and crosslinked by heat, light or an electronic beam to prepare a solid electrolyte having ionic conductivity.

Further, as the known solid electrolytes, there are exemplified a high molecular solid electrolyte prepared by a combination of a trifunctional high polymer having terminal acryloyl-modified alkylene oxide polymer chain, a low molecular alkylene oxide copolymer, polyvinyl chloride and an electrolyte salt (Japanese laid-Open Patent Publication No. 177,409 of 1991) and a solid electrolyte prepared by combining a terminal acryloyl-modified alkylene oxide polymer, an inorganic ionic salt and an organic solvent such as propylene carbonate (Japanese Laid-Open Patent Publication No. 94,501of 1988 corresponding to U.S. Pat. No. 4,908,283).

When these solid electrolytes are used in a cell and other electrochemical elements in place of the electrolytic liquids conventionally used, problems such as leakage of the liquid does not occur and high reliability can be assured advantageously.

However, its conductivity is lower than those of the conventional electrolytic liquids and hence the internal resistance becomes higher and, for example when used as an electrolyte in a cell, only a cell of very low capacity can be prepared disadvantageously.

Furthermore, the materials used are required to have high mechanical strength to match the light weight and thin shape of recent electric devices and the above proposals cannot satisfy it practically.

The object of the present invention is to overcome the above problems and to provide a solid electrolyte having a high conductivity and also having mechanical strength.

We, inventors, have investigated these problems and have found that a solid electrolyte having a high mechanical strength and having a conductivity comparable with the conventional electrolytic liquids and giving no bleed-out of the solvent can be prepared by a procedure in which a trifunctional terminal acryloyl-modified polymer having an alkylene oxide polymer chain consisting of not smaller than a specified number of monomer unit is used and further a solvent is added to it in a range of specified ratio and an electrolyte salt is added and the compound is crosslinked by an irradiation of an active radiation such as light and electron beam and/or heating to complete the present invention.

SUMMARY OF THE INVENTION

A solid electrolyte according to the invention is prepared by dissolving a solvent and an electrolyte salt in a trifunctional polymer and crosslinking it by an irradiation of an active radiation and/or heating, characterized by that the trifunctional polymer is a trifunctional terminal acryloyl-modified alkylene oxide polymer containing a polymer chain expressed by the following general formula (I) as each functional chain;

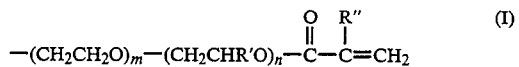

in which R' is a lower alkyl group, R" is hydrogen or methyl group and m or n is 0 or an integer of at least 1 and m+n≧35, and the amount of said solvent is 220 to 950 weight % based on said trifunctional terminal acryloyl-modified alkylene oxide polymer.

DETAILED DESCRIPTION OF THE INVENTION

The trifunctional terminal acryloyl-modified alkylene oxide polymer used in the invention is a compound prepared by a procedure in which, for example, glycerol or trimethylolpropane, etc. is used as the starting material and an alkylene oxide mentioned below is polymerized to it by ring opening, and the resultant trifunctional alkylene oxide polymer is esterified by an unsaturated organic acid such as acrylic acid and methacrylic acid or reacted with an acid chloride such as acrylic chloride and methacrylic chloride by dehydrochlorination and typically exemplified by a compound expressed by the following formula:

where R is a starting material residue, R' and R" are same as above, m and n are same as above and 130≧m+n≧35.

The alkylene oxides used for the synthesis of the trifunctional alkylene oxide polymer include, for example, ethylene oxide, propylene oxide, butylene oxide, 1,2-epoxyhexane and 1,2-epoxyoctane. Particularly preferred are ethylene oxide, propylene oxide and butylene oxide. The number of monomer units is required to be not less than 35 for each functional high molecular chain, that is polyalkylene oxide chain, of the trifunctional alkylene oxide polymer.

In the case of that the number of monomer unit is less than 35, it is difficult to crosslink by mixing the solvent in said trifunctional terminal acryloyl-modified alkylene oxide polymer in an amount not less than 220 weight % based on the polymer and thus the mechanical strength of the crosslinked product is remarkably poor and bleed-out of the solvent to the surface of the crosslinked product is remarkable.

The arrangement of the monomer units in said trifunctional alkylene oxide polymer may be block or random when two types of monomer are used.

Any solvent compatible with said trifunctional terminal acryloyl-modified alkylene oxide polymer can be used preferably in the solid electrolyte of the present invention and it is preferred to use at least one selected from the group consisting of ethylene carbonate, propylene carbonate, γ-butyrolactone, dimethoxyethane, dimethylsulfoxide, dioxolane, sulfolane and water.

The ratio of the solvent to said trifunctional terminal acryloyl-modified alkylene oxide polymer is 220 to 950 weight %. A ratio lower than 220 weight % gives a solid electrolyte of low conductivity. A ratio higher than 950 weight % gives a very low mechanical strength.

The electrolyte salt used in the solid electrolyte according to the present invention is at least one selected from the group consisting of lithium fluoride, lithium chloride, lithium bromide, lithium iodide, lithium nitrate, lithium thiocyanate, lithium perchlorate, lithium trifluoromethanesulfonate, lithium tetraborofluorate, lithium bistrifluoromethylsulfonylimide, lithium trifluoro-methylsulfonylmethide, sodium thiocyanate, sodium perchlorate, sodium trifluoromethanesulfonate, sodium tetraborofluorate, potassium thiocyanate, potassium perchlorate, potassium trifluoromethanesulfonate, potassium tetraborofluorate, magnesium thiocyanate, magnesium perchlorate and magnesium trifluoromethanesulfonate. The ratio of said electrolyte salt to the solvent is preferably 1 to 30 weight %.

As the means for preparing the solid electrolyte of the present invention by crosslinking, heating is also effective in addition to active radiation rays such as ultraviolet ray, visible ray and electron beam.

If required, it is also effective to add a photopolymerization initiator such as trimethylsilylbenzophenone, benzoin, 2-methylbenzoin, 4-methoxybenzophenone, benzoin methyl ether and anthraquinone and a polymerization initiator such as benzoyl peroxide and methyl ethyl ketone peroxide.

The solid electrolyte according to the invention can be easily prepared, for example, by a procedure in which a uniform liquid is prepared by a procedure of mixing uniformly a solvent containing dissolved electrolyte salt with a trifunctional terminal acryloyl-modified alkylene oxide polymer or by a procedure of mixing uniformly a solvent with a trifunctional terminal acryloyl-modified alkylene oxide polymer and dissolving an electrolyte salt in it and then the liquid is applied on a substrate uniformly by a knife coater, a bar coater, a gravure coater or a spin coater and crosslinked by a means mentioned above.

The solid electrolyte prepared according to the invention is high in mechanical strength and has a conductivity comparable with conventional electrolytic liquids with no bleed-out of the solvent.

PREFERRED EMBODIMENTS OF THE INVENTION

The following examples serve to illustrate the invention in more detail although the invention is not limited to the examples. Unless otherwise indicated, parts and % signify parts by weight and % by weight, respectively.

The trifunctional terminal acryloyl-modified alkylene oxide polymers according to the invention, Compounds No. A-1 to No. A-10, were produced as follows:

Compound No. A-1

92 g of glycerol as the starting material, 9.5 g of potassium hydroxide as the catalyst and 4700 g of ethylene oxide were fed in a 7 L (L means volumetric liter, same hereinafter) autoclave and they are reacted at 130° C. for 5 hours and then the product was neutralized and desalted to give 4610 g of a trifunctional ethylene oxide homopolymer. Its molecular weight was 4720 (calculated from its hydroxyl number).

944 g (0.2 mole) of the above polymer, 65 g (0.9 mole) of acrylic acid, 500 g of toluene and 2 g of conc. sulfuric acid as the catalyst were fed in a 2 L four-necked flask and they were reacted for 10 hours under stirring and refluxing while water was removed. Then, the product was neutralized and desalted for purification and toluene was removed to give the objective trifunctional terminal acryloyl-modified ethylene oxide homopolymer. Its molecular weight was 4890 (calculated by GPC).

Compound No. A-2

92 g of glycerol as the starting material, 15.0 g of potassium hydroxide as the catalyst, 3700 g of ethylene oxide and 1240 g of propylene oxide were fed in a 7 L autoclave and they were reacted at 115° C. for 7 hours and then the product was neutralized and desalted to give 4990 g of a trifunctional ethylene oxide-propylene oxide random copolymer. Its molecular weight was 5020 (calculated from its hydroxyl number).

1004 g (0.2 mole) of said copolymer, 65 g (0.9 mole) of acrylic acid, 500 g toluene and 3 g of conc. sulfuric acid as the catalyst were fed in a 2 L four-necked flask and they were reacted for 10 hours under stirring and refluxing while water was removed and then the product was neutralized and desalted for purification to prepare the objective trifunctional terminal acryloyl-modified ethylene oxide-propylene oxide random copolymer. Its molecular weight was 5180 (calculated by GPC).

Compound No. A-3

A trifunctional terminal acryloyl-modified ethylene oxide-propylene oxide random copolymer was prepared in the same manner as in the preparation of Compound No A-2 with the use of ethylene oxide and propylene oxide in a mole ratio of 4:1.

Compound No. A-4

92 g of glycerol as the starting material, 46 g of potassium hydroxide as the catalyst, 7950 g of ethylene oxide and 5250 g of propylene oxide were fed in a 20 L autoclave and they were reacted at 115° C. for 10 hours and then the product was neutralized and desalted to prepare 13,270 g of a trifunctional ethylene oxide-propylene oxide random copolymer. Its molecular weight was 13260 (calculated from its hydroxyl number).

1326 g (0.1 mole) of said copolymer, 32.5 g (0.25 mole) of acrylic acid, 1000 g toluene and 10 g of p-toluene sulfonic acid as the catalyst were fed in a 3 L four-necked flask and they were reacted for 12 hours under stirring and refluxing while water was removed and the product was neutralized and desalted for purification to prepare the objective trifunctional terminal acryloyl-modified ethylene oxide-propylene oxide random copolymer. Its molecular weight was 13420 (calculated by GPC).

Compound No. A-5

92 g of glycerol as the starting material, 51 g of potassium hydroxide as the catalyst, 3980 g of ethylene oxide and 10500 g of propylene oxide were fed in a 20 L autoclave and they were reacted at 115° C. for 12 hours and then the product was neutralized and desalted to prepare 14500 g of a trifunctional ethylene oxide-propylene oxide random copolymer. Its molecular weight was 14520 (calculated from its hydroxyl number).

1452 g (0.1 mole) of said copolymer, 32.5 g (0.45 mole) of acrylic acid, 1000 g toluene and 10 g of p-toluene sulfonic acid as the catalyst were fed in a 3 L four-necked flask and then they were treated in the same manner as in the preparation of Compound No. A-3 to prepare a trifunctional terminal acryloyl-modified ethylene oxide-propylene oxide random copolymer. Its molecular weight was 14680 (calculated by GPC).

Compound No. A-6

134 g of trimethylolpropane as the starting material, 68 g of potassium hydroxide as the catalyst and 10600 g of ethylene oxide were fed in a 30 L autoclave and they were reacted at 140° C. for 11 hours. Then, 8800 g of propylene oxide was fed and reacted at 110° C. for 15 hours and then the product was neutralized and desalted for purification to prepare 19500 g of a trifunctional ethylene oxide-propylene oxide block copolymer. Its molecular weight was 19,420 (calculated from its hydroxyl number).

1942 g (0.1 mole) of said copolymer, 39 g (0.45 mole) of methacrylic acid, 1200 g toluene and 20 g of p-toluene sulfonic acid as the catalyst were fed in a 3 L four-necked flask and then they were treated in the same manner as in the preparation of Compound No. A-3 to prepare a trifunctional terminal acryloyl-modified ethylene oxide-propylene oxide block copolymer. Its molecular weight was 19630 (calculated by GPC).

Compound No. A-7

A trifunctional terminal acryloyl-modified propylene oxide homopolymer was prepared in the same manner as in the preparation Compound No. A-6 with the use of glycerol as the starting material, only propylene oxide as the monomer and acrylic acid as the modifying monomer.

Compound No. A-8

134 g of trimethylolpropane as the starting material, 48 g of potassium hydroxide as the catalyst and 11900 g of butylene oxide were fed in a 20 L autoclave and they were reacted at 120° C. for 18 hours and then the product was neutralized and desalted for purification to prepare 12000 g of a trifunctional butylene oxide homopolymer. Its molecular weight was 12030 (calculated from its hydroxyl number).

1203 g (0.1 mole) of said copolymer, 33 g (0.46 mole) of methacrylic acid, 1500 g toluene and 30 g of p-toluene sulfonic acid as the catalyst were fed in a 3 L four-necked flask and then they were treated in the same manner as in the preparation of Compound No. A-3 to prepare a trifunctional terminal acryloyl-modified butylene oxide homopolymer. Its molecular weight was 12200 (calculated by GPC).

Compound No. A-9

A trifunctional terminal acryloyl-modified ethylene oxide-butylene oxide random copolymer was prepared in the same manner as in the preparation of Compound No. A-8 with the use of glycerol as the starting material and propylene oxide and butylene oxide as the monomer in a mole ratio of 4:1.

Compound No. A-10

92 g of glycerol as the starting material, 24 g of potassium hydroxide as the catalyst, 6970 g of propylene oxide and 1100 g of butylene oxide were fed in a 10 L autoclave and they were reacted at 115° C. for 15 hours and then the product was neutralized and desalted for purification to prepare 8100 g of a trifunctional propylene oxide-butylene oxide random copolymer. Its molecular weight was 8145 (calculated from its hydroxyl number).

814.5 g (0.1 mole) of said copolymer, 39 g (0.45 mole) of methacrylic acid, 1000 g toluene and 5 g of sulfuric acid as the catalyst were fed in a 2 L four-necked flask and then they were treated in the same manner as in the preparation of Compound No. A-3 to prepare a trifunctional terminal acryloyl-modified propylene oxide-butylene oxide random copolymer. Its molecular weight was 8360 (calculated by GPC).

Thus obtained Compounds No. A-1 to A-10 are shown in Table 1.

TABLE 1

| Compd. No. | Starting material*[1] | Monomer*[2] EO | PO | BO | Monomer arrangement*[3] | Molecular weight | Terminal acryloyl group*[4] | Molecular weight |
|---|---|---|---|---|---|---|---|---|
| A-1 | G | 35 | — | — | H | 4720 | A | 4890 |
| A-2 | G | 28 | 7 | — | R | 5020 | A | 5180 |
| A-3 | G | 40 | 10 | — | R | 7130 | A | 7290 |
| A-4 | G | 60 | 30 | — | R | 13260 | A | 13420 |
| A-5 | G | 30 | 60 | — | R | 14520 | A | 14680 |
| A-6 | T | 80 | 50 | — | B | 19420 | M | 19630 |
| A-7 | G | — | 50 | — | H | 8810 | A | 8970 |
| A-8 | T | — | — | 55 | H | 12030 | A | 12200 |
| A-9 | G | 40 | — | 10 | R | 7540 | A | 7700 |
| A-10 | G | — | 40 | 5 | R | 8145 | M | 8360 |

*[1]G: Glycerol, T: Trimethylolpropane.
*[2]EO: Ethylene oxide, PO: Propylene oxide, BO: Butylene oxide.
The figure shows the number of monomer units per polyalkylene oxide chain.
*[3]H: Homopolymer, R: Random copolymer, B: Block copolymer.
*[4]A: Acrylate, M: Methacrylate.

As the controls, the following trifunctional terminal acryloyl-modified alkylene oxide polymers, Compounds No. B-1 to No. B-3, were produced.

Compound No. B-1

92 g of glycerol as the starting material, 11 g of potassium hydroxide as the catalyst, 2640 g of ethylene oxide and 870 g of propylene oxide were fed in a 5 L autoclave and they were reacted at 115° C. for 8 hours and then the product was neutralized and desalted for purification to prepare 3580 g of a trifunctional ethylene oxide-propylene oxide random copolymer. Its molecular weight was 3600 (calculated from its hydroxyl number).

720 g (0.2 mole) of said copolymer, 65 g (0.9 mole) of acrylic acid, 1000 g toluene and 5 g of p-toluene sulfonic acid as the catalyst were fed in a 2 L four-necked flask and then they were reacted for 10 hours under stirring and refluxing while water was removed and then the product was neutralized and desalted for purification to prepare a trifunctional terminal acryloyl-modified ethylene oxide-propylene oxide random copolymer. Its molecular weight was 3760 (calculated by GPC).

Compound No. B-2

134 g of trimethylolpropane as the starting material, 5.4 g of potassium hydroxide as the catalyst, 1320 g of ethylene oxide and 350 g of propylene oxide were fed in a 5 L autoclave and they were reacted at 115° C. for 5 hours and then the product was neutralized and desalted for purification to prepare 1790 g of a trifunctional ethylene oxide-propylene oxide random copolymer. Its molecular weight was 1800 (calculated from its hydroxyl number).

900 g (0.5 mole) of said copolymer, 162 g (2.25 mole) of acrylic acid, 1000 g toluene and 5 g of p-toluene sulfonic acid as the catalyst were fed in a 3 L four-necked flask and then they were treated in the same manner as in Comparative Synthetic Example 1 to prepare a trifunctional terminal acryloyl-modified ethylene oxide-propylene oxide random copolymer. Its molecular weight was 1960 (calculated by GPC).

Compound No. B-3

92 g of glycerol as the starting material, 20 g of potassium hydroxide as the catalyst, 1325 g of ethylene oxide and 4330 g of butylene oxide were fed in a 10 L autoclave and they were reacted at 115° C. for 11 hours and then the product was neutralized and desalted for purification to prepare 5730 g of a trifunctional ethylene oxide-butylene oxide random copolymer. Its molecular weight was 5740 (calculated from its hydroxyl number).

574 g (0.1 mole) of said copolymer, 39 g (0.45 mole) of methacrylic acid, 1000 g toluene and 5 g of sulfuric acid as the catalyst were fed in a 2 L four-necked flask and then they were treated in the same manner as in Comparative Synthetic Example 1 to prepare a trifunctional terminal acryloyl-modified ethylene oxide-butylene oxide random copolymer. Its molecular weight was 5930 (calculated by GPC).

These Compounds No. B-1 to No. B-3 are shown in Table 2.

EXAMPLE 3

Example 1 was repeated except that 1 g of the Compound No. A-3, 2 g of propylene carbonate, 4 g of dimethoxyethane and 0.6 g of lithium tetraborofluoride were used.

EXAMPLE 4

Example 1 was repeated except that 1 g of the Compound No. A-4, 9.5 g of γ-butyrolactone and 0.9 g of lithium thiocyanate were used.

EXAMPLE 5

Example 1 was repeated except that 1 g of the Compound No. A-5, 2.5 g of propylene carbonate and 0.25 g of lithium perchlorate were used.

EXAMPLE 6

Example 1 was repeated except that 1 g of the Compound No. A-6, 9.5 g of propylene carbonate and 2 g of lithium trifluoromethanesulfonate were used.

EXAMPLE 7

Example 1 was repeated except that 1 g of the Compound No. A-7, 5 g of ethylene carbonate and 0.5 g of lithium perchlorate were used.

EXAMPLE 8

Example 1 was repeated except that 1 g of the Compound No. A-8, 2.5 g of sulfolane and 0.2 g of lithium perchlorate were used.

EXAMPLE 9

Example 1 was repeated except that 1 g of the Compound No. A-9, 4 g of ethylene carbonate and 0.6 g of lithium perchlorate were used.

EXAMPLE 10

Example 1 was repeated except that 1 g of the Compound No. A-10, 8 g of propylene carbonate and 0.8 g of lithium tetraborofluoride were used.

TABLE 2

| Compd. No. | Starting material | Comparative polymers Monomer | | | Monomer arrangement | Molecular weight | Terminal acryloyl group | Molecular weight |
| --- | --- | --- | --- | --- | --- | --- | --- | --- |
| | | EO | PO | BO | | | | |
| B-1 | G | 20 | 5 | — | R | 3600 | A | 3760 |
| B-2 | T | 10 | 2 | — | R | 1800 | A | 1960 |
| B-3 | G | 10 | — | 20 | R | 5740 | M | 5930 |

EXAMPLE 1

4 g of propylene carbonate and 0.4 g of lithium perchlorate were mixed with 1 g of the Compound No. A-1 and dissolved uniformly and the obtained solution was spread on a glass plate and ultraviolet ray was irradiated on it at a power of 7 mW/cm² for 3 minutes under nitrogen atmosphere to prepare a solid electrolyte of 500 μm thick. Its conductivity was measured at 20° C. and −10° C. by the complex impedance method. Its tensile strength and elongation were also measured.

EXAMPLE 2

Example 1 was repeated except that 1 g of the Compound No. A-2, 6 g of propylene carbonate and 0.5 g of lithium perchlorate were used.

Comparative Example 1

Example 1 was repeated except that 1 g of the Compound No. A-1, 1 g of propylene carbonate and 0.1 g of lithium perchlorate were used.

Comparative Example 2

Example 1 was repeated except that 1 g of the Compound No. A-2, 2 g of propylene carbonate and 0.2 g of lithium perchlorate were used.

Comparative Example 3

1 g of the Compound No. B-1, 4 g of propylene carbonate and 0.4 g of lithium perchlorate were mixed and crosslinking was carried out in the same manner as in Example 1. No self-standing solid electrolyte was obtained and it became gel.

Comparative Example 4

1 g of the Compound No. B-2, 3 g of propylene carbonate and 0.4 g of lithium perchlorate were mixed and crosslinking was carried out in the same manner as in Example 1. No self-standing solid electrolyte was obtained.

Comparative Example 5

1 g of the Compound No. B-3, 3 g of propylene carbonate and 0.4 g of lithium perchlorate were mixed and crosslinking was carried out in the same manner as in Example 1. Though a self-standing solid was obtained, a large amount of the solvent bled out on the surface.

The results of these Examples and Comparative Examples are shown in Table 3.

TABLE 3

| | Conductivity (s/cm) | | Tensile strength $(kgf/cm^2)$ | Elongation (%) |
|---|---|---|---|---|
| | 20° C. | −10° C. | | |
| Examples | | | | |
| 1 | $3.0 \times 10^{-3}$ | $1.1 \times 10^{-3}$ | 4.5 | 110 |
| 2 | $4.5 \times 10^{-3}$ | $1.7 \times 10^{-3}$ | 3.8 | 95 |
| 3 | $6.1 \times 10^{-3}$ | $2.8 \times 10^{-3}$ | 8.5 | 190 |
| 4 | $5.2 \times 10^{-3}$ | $1.2 \times 10^{-3}$ | 5.2 | 89 |
| 5 | $2.1 \times 10^{-3}$ | $1.0 \times 10^{-3}$ | 7.5 | 95 |
| 6 | $7.1 \times 10^{-3}$ | $2.1 \times 10^{-3}$ | 6.2 | 120 |
| 7 | $4.3 \times 10^{-3}$ | $1.8 \times 10^{-3}$ | 8.3 | 105 |
| 8 | $2.3 \times 10^{-3}$ | $1.0 \times 10^{-3}$ | 4.4 | 89 |
| 9 | $3.2 \times 10^{-3}$ | $1.1 \times 10^{-3}$ | 5.9 | 160 |
| 10 | $4.8 \times 10^{-3}$ | $2.1 \times 10^{-3}$ | 9.0 | 120 |
| Comparative Examples | | | | |
| 1 | $1.1 \times 10^{-4}$ | $9.0 \times 10^{-4}$ | 4.2 | 40 |
| 2 | $2.9 \times 10^{-4}$ | $9.8 \times 10^{-4}$ | 2.6 | 30 |

An electrochemical element which has both a high conductivity and a high mechanical strength and thus is high in reliability and good in performance can be prepared by using the solid electrolyte according to the present invention.

What is claimed is:

1. A solid electrolyte prepared by dissolving a solvent and an electrolyte salt in a trifunctional polymer and crosslinking the resultant product by active radiation or heating, and characterized by that said trifunctional polymer is a trifunctional terminal acryloyl-modified alkylene oxide polymer which has the formula:

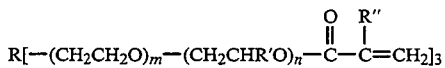

in which R is a glycerol or trimethylolpropane residue, R' is a lower alkyl group, R'' is hydrogen or methyl group and m or n is 0 or an integer of at least 1 and $130 \geq m+n \geq 35$, and the amount of said solvent is 220 to 950 weight % based on said trifunctional terminal acryloyl-modified alkylene oxide polymer.

2. A solid electrolyte according to claim 1, wherein said solvent is at least one selected from the group consisting of ethylene carbonate, propylene carbonate, γ-butyrolactone, dimethoxyethane, dimethylsulfoxide, dioxorane, sulfolane and water.

3. A solid electrolyte according to claim 1 or 2, wherein said electrolyte salt is at least one selected from the group consisting of lithium fluoride, lithium chloride, lithium bromide, lithium iodide, lithium nitrate, lithium thiocyanate, lithium perchlorate, lithium trifluoromethanesulfonate, lithium tristrifluoromethyl-sulfonylmethide, sodium thiocyanate, sodium perchlorate, sodium trifluoromethanesulfonate, sodium tetraborofluoride, potassium thiocyanate, potassium perchlorate, potassium trifluoromethanesulfonate, potassium tetraborofluoride, magnesium thiocyanate, magnesium perchlorate and magnesium trifluoromethanesulfonate.

* * * * *